United States Patent Office 2,821,427
Patented Jan. 28, 1958

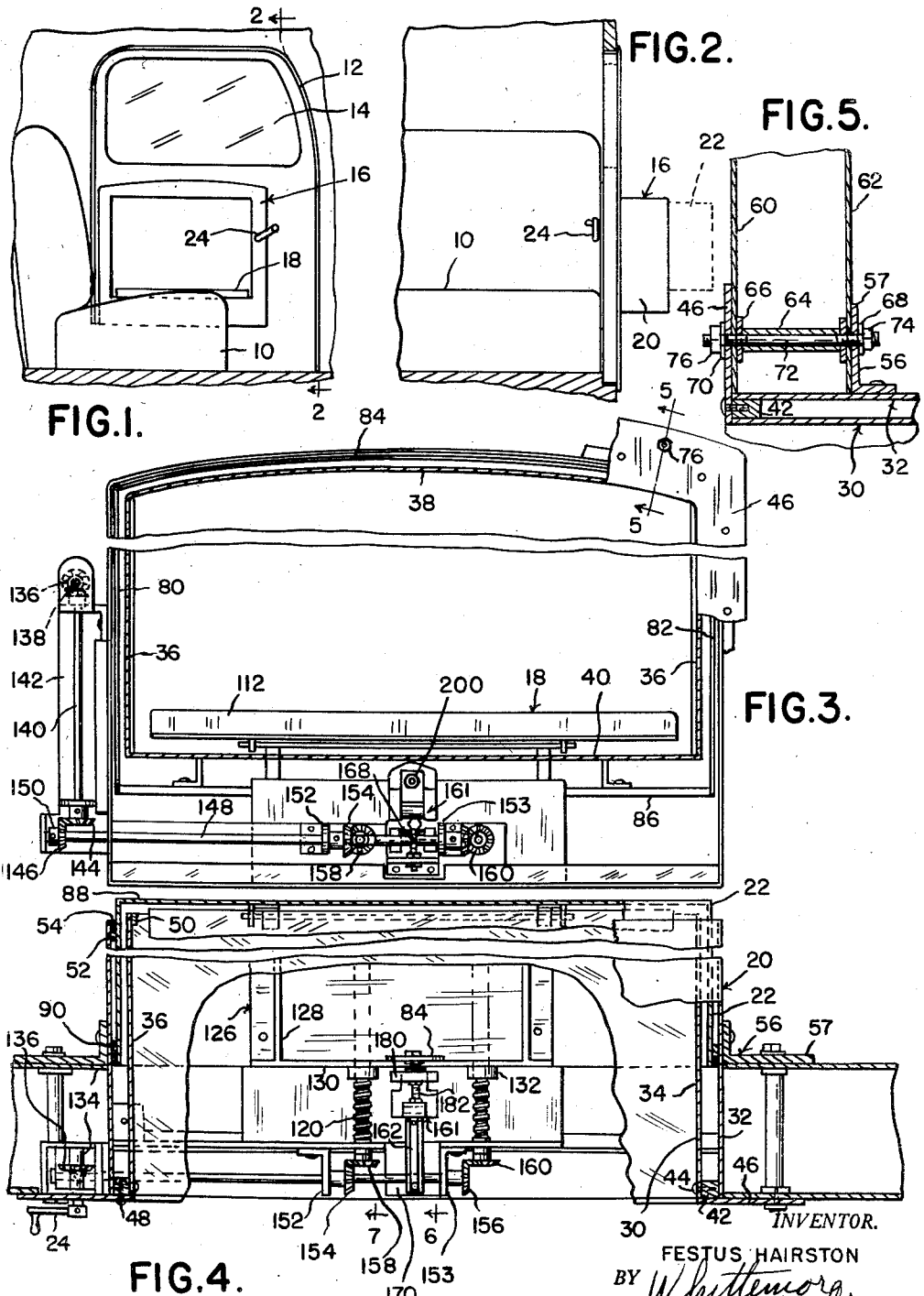

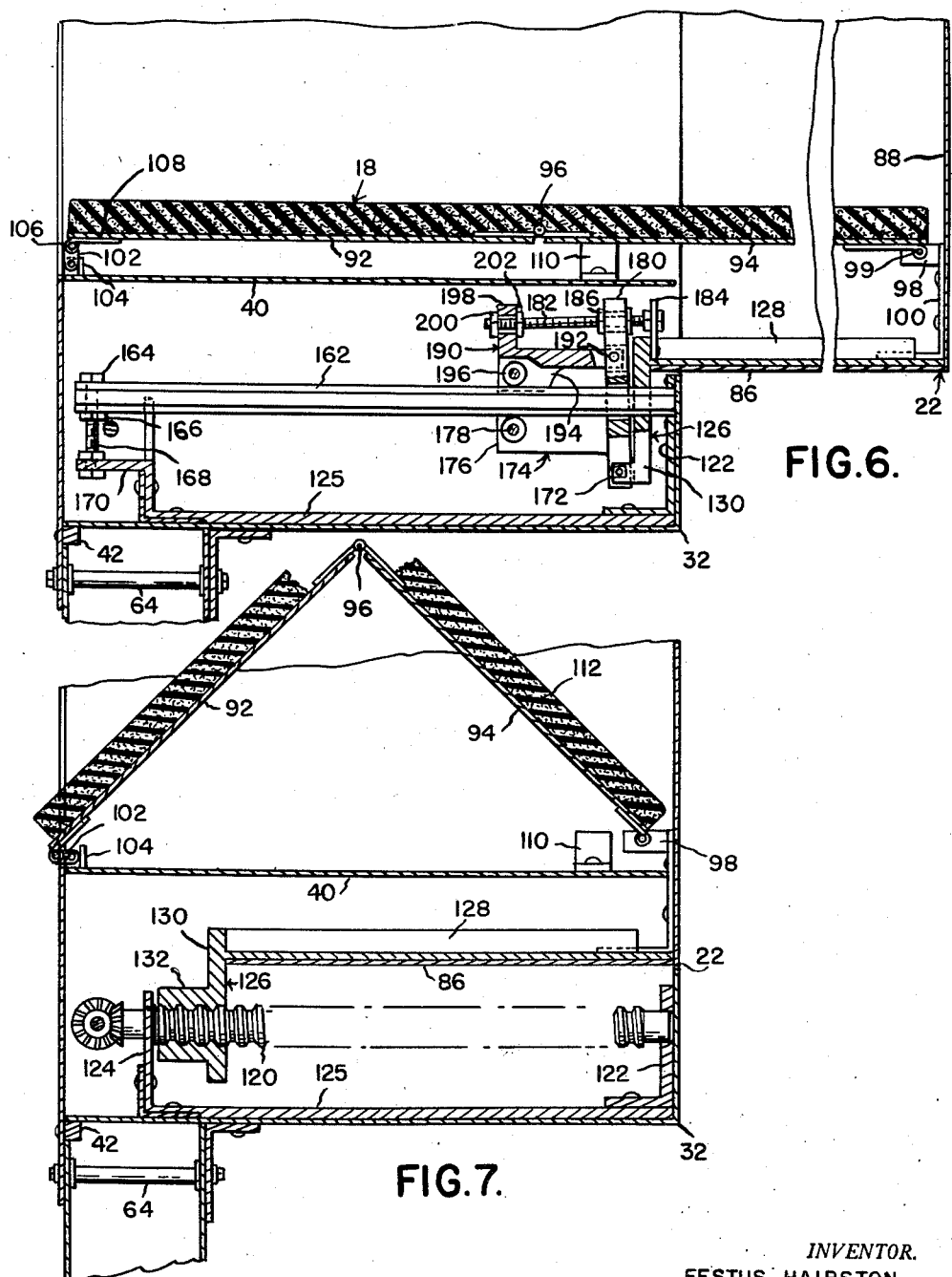

2,821,427
SLEEPING ATTACHMENT FOR VEHICLES
Festus Hairston, Detroit, Mich.
Application October 4, 1954, Serial No. 459,926
9 Claims. (Cl. 296—23)

The present invention relates to a sleeping attachment for vehicles, and more particularly, for vehicles such as trucks in which the driver is sometimes required to drive cross country without relief. In such cases in order to avoid the hazards incidental to driver fatigue, it is quite common for truck drivers to pull the trucks off the road and to sleep for a short interval.

While elaborate sleeping accommodations are neither required nor desired, it is nevertheless undesirable to require the driver to attempt to sleep while curled up on the seat of the truck which normally is substantially shorter than the height of the driver.

The present invention provides a movable housed extension preferably carried by one of the doors of the truck substantially at the level of the seat, which can be extended to provide a support or rest onto which the feet of the driver may be placed. This support is completely housed so that its extension into operative position provides a generally horizontal support including the seat on which a driver of average size may stretch out completely. When not in use the attachment is retracted to a position in which it does not extend outwardly from the side of the door an objectionable amount.

An attachment of this type is disclosed in my prior Patent 2,506,870 and the present invention relates to an improved form of sleeping attachment.

It is an object of the present invention to provide an improvement in sleeping attachments comprising an extensible sleeping attachment including an operating mechanism for extending or retracting the attachment.

It is a further object of the present invention to provide an attachment of the character described including an articulated support structure which assumes a horizontal position in operative condition and which automatically folds upon movement of the attachment to inoperative position.

It is a further object of the present invention to provide a sleeping attachment of the character described which is constructed and arranged so that no moving parts thereof can be jammed or improperly operated by an operator, no matter how heedless or careless he may be.

It is a further object of the present invention to provide a sleeping attachment of the character described comprising a movable section and a support rail therefor.

It is a further object of the present invention to provide in structure of the character described, a movable section, threaded means for effecting horizontal movement of the section, a support rail for the section generally horizontal to the axis of the threaded means, at least one roller carried by the section engageable with the rail, and means for effecting adjustment of the roller relative to the section to bring it into operative engagement with the rail.

It is a further object of the present invention to provide a movable section, threaded means for effecting movement of the section, a support rail extending generally parallel to the axis of the threaded means, adjusting means for the support rail for bringing the support rail into true parallelism with the axis of the threaded means, and roller means on the section engageable with the rail.

It is a further object of the present invention to provide structure of the character described in the preceding paragraph in which the roller means comprises a pair of rollers engageable with opposite sides of the rail, and means for effecting independent adjustment of the rollers to bring both of the rollers into operative engagement with the rail.

Other objects and features of the invention will become apparent as the description proceeds, especially when taken in conjunction with the accompanying drawings, wherein:

Figure 1 is a fragmentary side elevational view taken at the interior of an automobile showing the location of the sleeping attachment relative to known elements of the automobile body.

Figure 2 is a fragmentary sectional view looking rearwardly in the direction of the arrows 2—2, Figure 1.

Figure 3 is a front elevation of the attachment with parts broken away.

Figure 4 is a plan view of the attachment in place in an opening in the wall of a vehicle, with parts broken away.

Figure 5 is an enlarged fragmentary sectional view on the line 5—5, Figure 3.

Figure 6 is an enlarged fragmentary sectional view taken on the line 6, Figure 4, showing the housing extended.

Figure 7 is an enlarged sectional view taken on the line 7, Figure 4, showing the housing collapsed.

The sleeping attachment is designed for use with a vehicle, and preferably with the cab of a truck, the cab having the conventional seat 10 therein and provided with a door 12 having a window 14 therein. The sleeping attachment is designated in its entirety by the reference numeral 16, and as will subsequently appear includes a floor structure indicated generally at 18 adapted to be substantially in the same horizontal position as the top of the seat structure 10. In general, the sleeping attachment 18 comprises a horizontally collapsible and extensible housing which includes a fixed double walled section 20 and a telescopically related movable section 22 which is shown in dotted lines in extended position in Figure 2. Suitable means including a crank 24 are provided for effecting horizontal movement of the section 22 between the extended position illustrated in dotted lines in Figure 2 and the collapsed position in which it is received substantially completely within the stationary or fixed section 20. The crank may be provided at either the right or left hand side of the structure as desired.

Referring now to the details of the sleeping attachment, the fixed section 20 comprises an inner portion 30 and an outer portion 32 which are spaced apart to receive the movable extension 22. The inner portion 30 comprises side walls 34 and 36, a top wall 38 and a bottom wall 40. Extending around the forward edge of the inner portion 30 at the outside thereof is a frame comprising rigid bars 42 secured to the inner portion by suitable means such for example as screws indicated at 44. An outwardly extending flange 46 is provided which may also be connected to the frame bars 42 by suitable means such for example as screws indicated at 48. At the rear or outer end of the inner portion 30 of the fixed housing section 20 is a reinforcing bead 50 secured to the inner edge thereof by welding or the like.

The outer portion 32 of the fixed double walled housing section 20 is provided at its inner or rear end with a metallic abutment flange 52 and a rubber sealing flange 54. It is also provided with an angle iron 56 providing continuous mounting flanges 57 extending around the housing.

The fixed double walled section 20 is mounted in an opening formed in the wall or door of the vehicle as best illustrated in Figure 5. In this figure the door or wall of the vehicle is shown as comprising an inner panel 60 and an outer panel 62. The spacing between these panels varies in different vehicles and moreover, the panels may not be strictly parallel. Accordingly, the mounting of the sleeping attachment in a particular vehicle requires the use of spacers 64 which are formed to the required length for the particular vehicle. The flange 46 which is secured to the inner portion 30 of the fixed housing by the frame bars 42 abuts the inner surface of the inner panel 60. The flange 57 of the angle iron 56 which is secured to the outer portion 32 of the fixed housing section abuts the outer surface of the outer wall panel 62. Since the panels 60 and 62 are formed of sheet metal, a special construction is required to permit these sheet metal panels to afford a firm and secure mounting for the sleeping attachment.

In its preferred form this special construction comprises tubular spacers 64 which are separately cut in accordance with the particular location and the actual spacing between the panels 60 and 62 at that point. Associated with each spacer 64 are a pair of relatively large washers 66 which engage the inner surfaces of the panels 60 and 62. Washers 68 and 70 are provided which engage the outer surfaces of the flanges 57 and 46 respectively. An elongated threaded member 72 extends through openings formed in the flanges 46 and 57 and in the panels 60 and 62. As illustrated in Figure 5, the threaded member 72 carries nuts 74 and 76 at opposite ends, although of course it will be appreciated that at either end thereof the elongated threaded member may if desired be provided with a bolt head. The foregoing construction results in a firm and rigid support for the sleeping attachment by the relatively thin metal panels 60 and 62 of the vehicle door or wall.

As previously indicated, the movable housing section 22 is telescopically received between the double walls of the fixed housing section 20. The movable section 22 includes side walls 80 and 82, a top wall 84, and a bottom wall 86. The outer end of the movable housing section 22 is provided with an end wall 88. The movable housing section 22 at its forward end is provided with a metallic bead or abutment 90 which is engageable with the flange 52 so as to limit movement of the movable section 22 outwardly with respect to the fixed section 20. At this time the rubber seal 54 renders the entire housing water-tight.

In order to provide a smooth padded support for the feet of the user, an articulated floor structure comprising separate floor members 92 and 94 is provided. Floor members 92 and 94 are interconnected by a hinge indicated at 96. The floor member 94 at the edge remote from the hinge 96 is pivoted to an ear 98 carried by a pivot pin 99. The ear 98 is carried by a bracket 100 secured to the bottom wall 86 and the rear wall 88 of the movable housing section.

At the forward end of the bottom wall 40 of the inner portion 30 of the fixed section 20 there is provided a link 102 pivoted to a bracket on the wall 40 and adjacent a fixed abutment plate 104. The abutment plate 104 engages the link when the link extends upwardly as seen in Figure 6, to prevent inward rocking movement of the link from the illustrated position. At its other end the link is provided with a pivot connection 106 to a bracket 108 on the underside of the forward end of the floor member 92.

The bottom wall 40 is provided with a series of abutments 110 engageable with one or the other or both of the floor members 92 or 94 to support the central portion of the articulated floor when it is in the operative position illustrated in Figure 6. The abutments 110 are dimensioned to support the axis of the pivot connection provided by the hinge 96 substantially in the horizontal plane passing through the axes of the pivot connections 99 and 106.

Suitable means later to be described are provided for effecting collapse and extension of the housing, and more particularly, horizontal movement of the movable section 22 relative to the fixed section 20. With the parts in the position illustrated in Figure 6 it will be observed that the floor members 92 and 94 occupy a horizontal plane and that the left hand end of the floor member 92 is supported in the illustrated position by virtue of the fact that the link 102 has been swung upwardly to the illustrated position where it abuts against the stop plate 104. If now, the actuating mechanism causes the movable section 22 to move to the left as seen in Figure 6, this movement is permitted in the first instance by rocking movement of the link 102 to the position shown in Figure 7. This has the immediate effect of dropping the axis of the pivot connection 106 below a plane passing through the axes of the hinge 96 and pivot pin 99. Accordingly, the arrangement prevents the floor members from locking the movable housing section against movement and permits its free movement in telescopic direction. As the inner section reaches its fully collapsed position the articulated floor members 92 and 94 reach the upwardly folded position illustrated in Figure 7. The floor members 92 and 94 are preferably provided with suitable padding material 112 which may conveniently be in the form of sponge rubber and suitably adhered or otherwise attached to the articulated floor members. It may also be mentioned at this time that if desired the inner surface of the inner portion of the fixed housing section and the inner surfaces of the movable housing section may have suitable padding material adhered or otherwise attached thereto.

The mechanism for actuating the housing between its collapsed and extended positions comprises a pair of screw shafts 120 which are journaled for rotation in brackets 122 secured to the outer portion 32 of the fixed section of the housing and journaled at their forward ends in upwardly extending flanges 124 of brackets 125 which are secured to the bottom wall of the outer portion of the fixed housing. A relatively heavy rigid support member 126 is provided which is bolted or otherwise secured to the bottom wall 86 of the movable housing section 22. The support member 126 preferably is in the form of a casting and includes upwardly extending reinforcing ribs 128 and a transversely extending vertical plate 130 provided with a pair of tubular forward extensions 132 which are internally threaded to cooperate with the screws 120. The actuating mechanism for moving the movable section 22 comprises a shaft 134 having the actuating crank 24 at its forward end. The shaft 134 carries a bevel gear 136 which meshes with a bevel gear 138 carried at the upper end of a shaft 140 journaled for rotation in a bracket 142. At its lower end the shaft 140 carries a bevel gear 144 which meshes with a bevel gear 146 secured to a shaft 148 journaled in supporting brackets 150, 152 and 153. The shaft 148 carries bevel gears 154 and 156 which mesh respectively with bevel gears 158 and 160 carried at the forward end of the screws 120. From the foregoing it will be apparent that rotation of the crank 24 results in equal uniform rotation of the screw shafts 120 and accordingly will cause the threaded tubular extensions 132 of the frame to move longitudinally of the screw shafts, thus carrying the movable housing section 22 therewith.

While the internally threaded tubular portions 132 of the frame 126 have a substantial axial dimension, they alone are insufficient to support the movable housing section 22 without binding between the threads of the screws 120 and the threads at the interior of the tubular portions 132. In order to provide means for cooperating with the screws and threaded portions 132 to support the movable housing section 22 there is provided roller mechanism indicated generally at 161 cooperating with a guide rail 162, all as best seen in Figure 6. The guide rail 162 has its rear end permanently secured in the bracket 122 and at its forward end it is adjustably supported by nuts 164 and 166 on a bolt or screw 168 extending upwardly from a flange 170 and through an opening provided at the forward end of the rail 162. This means permits bringing the rail 162 into substantially true parallelism with respect to the screws 120, a condition which is essential to prevent binding as the collapsible and extensible housing is actuated.

In order to provide the necessary support for the movable housing section 22, support member 126 has adjacent the bottom of the plate 130 inwardly extending ears 172 which pivotally support a carrier 174 having forwardly extending arms 176 between which is journaled a roller 178. The carrier 174 includes an upper extending portion 180 apertured to receive an adjusting screw or bolt 182 which is suitably anchored in a bracket 184 formed as a part or connected to rigid support member 126. Carried by the screw 182 are adjusting nuts 186 and by appropriate manipulation of these nuts the carrier 174 may be rocked about the pivot axis of its connection with the ears 172. The roller 178 is located so that this angular adjustment of the carrier 174 produces generally vertical adjustment of the roller. A second carrier 190 is provided which is pivoted to the first carrier by pivot means indicated at 192, the second carrier including spaced arms 194 between which is journaled a second roller 196 engageable with the upper surface of the rail 162. The second carrier 190 includes an upwardly extending flange 198 apertured to receive the forward end of the bolt 182. Adjusting nuts 200 and 202 are provided on the bolt and adjustment of these nuts will effect angular adjustment of the second carrier 190 about the axis of pivot connection 192. This in turn results in substantial vertical adjustment of the roller 196.

From the foregoing it will be observed that by appropriate adjustment of the carriers 174 and 190, the rollers 178 and 196 may be suitably adjusted to support the movable housing section 22 in position with the axis of the internally threaded tubular extensions 132 of its support frame in parallelism with the screws 120.

It will also be observed by a comparison of Figures 6 and 7 that the vertical plane passing through the axes of rollers 178 and 196 is located substantially to the left of the internally threaded tubular extensions 132, thus providing adequate support for the movable housing section 22 both in its collapsed and extended position.

The drawings and the foregoing specification constitute a description of the improved sleeping attachment for vehicles in such full, clear, concise and exact terms as to enable any person skilled in the art to practice the invention, the scope of which is indicated by the appended claims.

What I claim as my invention is:

1. A sleeping attachment for vehicles comprising a collapsible and extensible housing having a generally tubular fixed section adapted to be mounted in an opening in a wall of the vehicle, a generally tubular section slidable in telescopic relation to said fixed section and having a closed outer end, means for moving said movable section between extended operative position and retracted inoperative position, and an articulated floor in said housing comprising a pair of floor members pivoted respectively to said fixed section and said movable section, said floor members being pivoted together and movable to a substantially horizontal position when said housing is extended and to an upwardly folded position when said housing is collapsed, means for supporting the floor members in horizontal position when the housing is fully extended, a link at the edge of said floor member pivoted to said fixed section, and an abutment engageable by said link when said link is rocked into upper position by extension of said housing whereby collapse of said housing rocks said link away from said abutment to increase misalignment between the pivot axes of said floor members to establish forces tending to cause said floor members to be folded up upon collapse of said housing.

2. Apparatus of the character described comprising a fixed housing section, a movable housing section telescopically received in said fixed housing section, screw means for effecting relative movement between said sections comprising an elongated screw carried by one of said sections and a nut on said screw connected to the other of said sections, means for effecting relative rotation between said screw and nut, rail means for supporting said movable section comprising a guide rail carried by one of said sections, roller means carried by said other section, and adjustment means for bringing said screw and rail into substantially true parallelism.

3. Apparatus as defined in claim 2 in which said adjustment means is associated with said rail for effecting adjustment thereof and comprises a screw and nut assembly connecting one end of said rail to one section.

4. Apparatus of the character described comprising a fixed housing section, a movable housing section telescopically received in said fixed housing section, screw means for effecting relative movement between said sections comprising an elongated screw carried by one of said sections and a nut on said screw connected to the other of said sections, means for effecting relative rotation between said screw and nut, rail means for supporting said movable section comprising a guide rail carried by one of said sections, roller means carried by the other section, adjustment means for bringing said screw and rail into substantially true parallelism, means for effecting vertical adjustment of said roller means, said roller means comprising a first carrier, means mounting said first carrier for adjustment on a housing section, a roller on said first carrier, a second carrier, means mounting said second carrier for adjustment on said first carrier, and a roller on said second carrier.

5. Apparatus as defined in claim 4 in which the means mounting both of said carriers comprise pivot mountings with parallel axes.

6. Apparatus as defined in claim 5 in which both of said carriers have aligned openings therein, a screw secured to the housing section carrying said carriers, and separate nut means on said screw for selectively adjusting both of said carriers.

7. Apparatus of the character described comprising a fixed housing section, a movable housing section telescopically received in said fixed housing section, screw means for effecting relative movement between said sections comprising an elongated screw carried by one of said sections and a nut on said screw connected to the other of said sections, means for effecting relative rotation between said screw and nut, rail means for supporting said movable section comprising a guide rail carried by one of said sections, roller means carried by the other section, said roller means comprising a first carrier, means mounting said first carrier for adjustment on a housing section, a roller on said first carrier, a second carrier, means mounting said second carrier for adjustment on said first carrier, and a roller on said second carrier.

8. Apparatus as defined in claim 7 in which the means mounting both of said carriers comprise pivot mountings with parallel axes.

9. Apparatus as defined in claim 8 in which both of said carriers have aligned openings therein, a screw secured to the housing section carrying said carriers, and separate nut means on said screw for selectively adjusting both of said carriers.

References Cited in the file of this patent

UNITED STATES PATENTS

| 1,317,895 | Rudy | Oct. 7, 1919 |
| 2,100,323 | Fitch | Nov. 30, 1937 |
| 2,150,615 | Sword | Mar. 14, 1939 |
| 2,506,870 | Hairston | May 9, 1950 |

FOREIGN PATENTS

| 1,033,260 | France | July 9, 1953 |
| 485,330 | Great Britain | May 18, 1938 |